United States Patent [19]
Fries et al.

[11] 3,795,167
[45] Mar. 5, 1974

[54] PLATE TRIMMING SHEARS

[75] Inventors: Gunter Karl Fries, Neunkirchen-Saar; Ernst-Gunther Oberhauser, Rohrbach-Saar, both of Germany

[73] Assignee: Moeller & Neumann GmbH, Ingbert/Saar, Germany

[22] Filed: May 5, 1972

[21] Appl. No.: 250,699

[30] Foreign Application Priority Data
May 8, 1971 Germany............................ 2122855

[52] U.S. Cl............... 83/514, 83/356.1, 83/622, 83/628, 83/632, 83/646, 83/923
[51] Int. Cl............................................. B26d 11/00
[58] Field of Search .. 83/602, 607, 923, 646, 647.5, 83/514, 355, 356.1, 356, 620, 622, 628, 632

[56] References Cited
UNITED STATES PATENTS

| | | | |
|---|---|---|---|
| 3,492,898 | 3/1970 | Benz | 83/602 X |
| 3,667,335 | 6/1972 | Hamacher | 83/923 X |
| 3,293,969 | 12/1966 | Greis | 83/646 X |
| 2,618,840 | 11/1952 | Danly et al. | 83/923 X |
| 2,130,818 | 9/1938 | Soderberg | 83/646 X |

Primary Examiner—Andrew R. Juhasz
Assistant Examiner—W. D. Bray
Attorney, Agent, or Firm—John J. Dennemeyer

[57] ABSTRACT

Plate trimming shears especially for heavy plates include cutter blades one of which receives a rocking movement so as to perform a rolling cut and a cross cutter is provided for chopping off the waste strip trimmed from the plate, the cross cutter being supported in its own guide and functionally connected to the support carrying the moving cutter blade so that the cross cutter executes a linear chopping cut with an operating movement derived from the moving cutter support.

4 Claims, 2 Drawing Figures

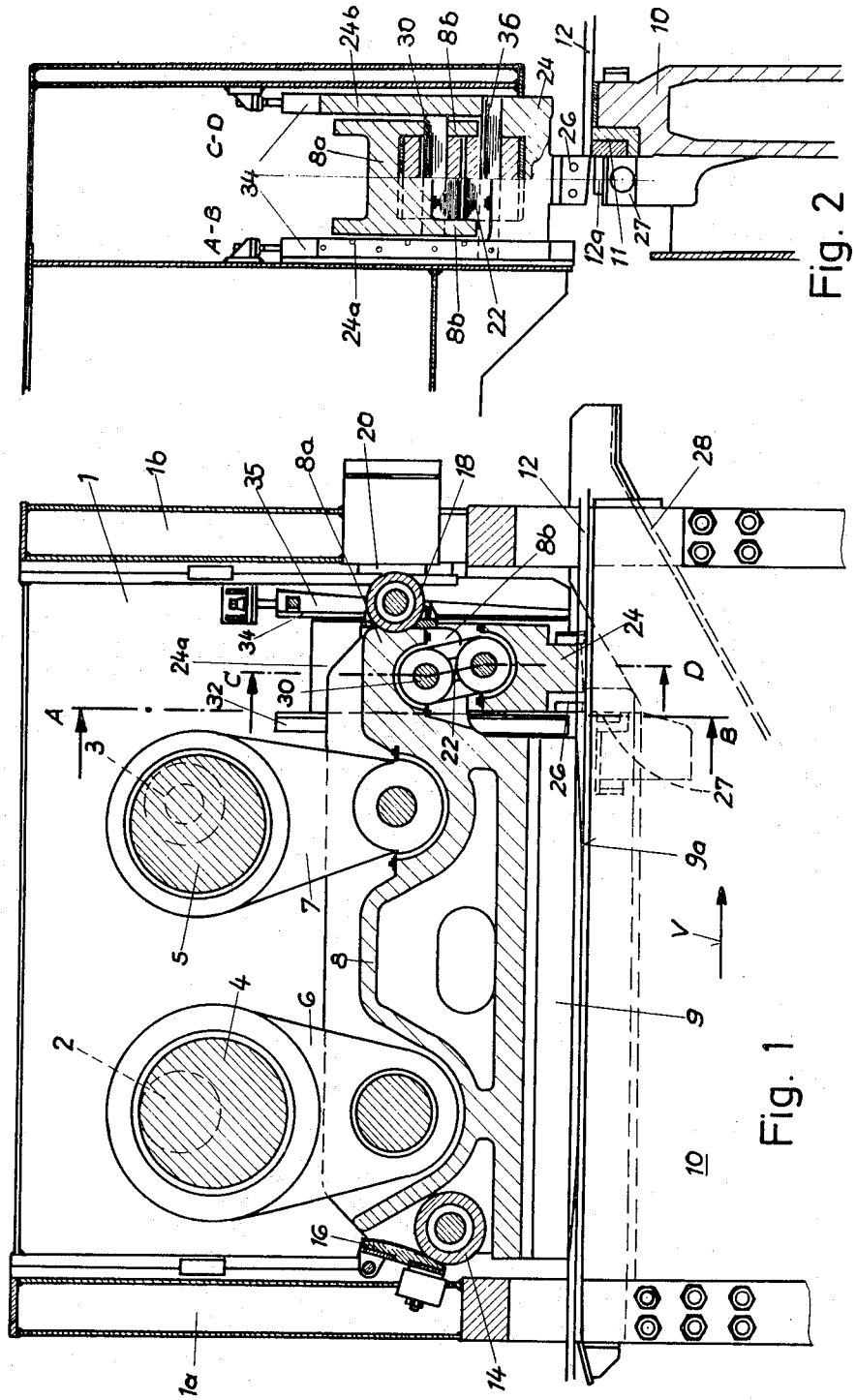

PLATE TRIMMING SHEARS

The invention relates to a plate trimming shears, especially for trimming heavy plates, having an upper cutter support which executes a rocking movement, and a stationary lower cutter support.

The primary object of the invention is to provide a construction including a pair of cross cutters arranged on the exit side for chopping the waste strip trimmed from the plate.

In German App. No. 1,627,268 the upper cross cutter is secured directly to the upper cutter support, which carries an upper trimming cutter with a curved cutting edge, in order to use the rocking movement for driving the upper cross cutter. The upper cross cutter therefore participates in the rocking movement of the upper cutter support. Since however the rocking movement of the upper cross cutter is effected transversely to the cutting edge thereof and the lower cross cutter is stationary, the horizontal cutter gap between the upper and lower cross cutters varies in a disadvantageous way during the chopping cut. Having regard to the various plate thicknesses which will be handled in a heavy plate shearing line it necessarily follows that a setting which is correct for a maximum plate thickness of say 40 to 50 mm can no longer be optimum for a minimum plate thickness of about 5 mm.

The invention is directed to the problem of developing rolling cut trimming shears, or also a so-called rocking cut shear with a straight inclined upper trimming cutter, in such manner that the horizontal cutter gap of a pair of cross cutters arranged on the exit side is constant despite the fact that the drive is taken from the rocking movement of the upper cutter support during the chopping cut.

According to the invention the upper cross cutter is arranged on its own linear cutter slide within lateral guides for the upper cutter support, which is functionally connected through a plunger to the exit end of the upper cutter support. The linear guides for the cutter slide of the upper cross cutter can run precisely vertically and the cross cutter should be disposed as close as possible to the trimmed plate edge, but it is also possible to arrange the linear guides in a manner somewhat inclined to the vertical in order reliably to engage the full width of the edge strip by the upper cross cutter. In this case the functional connection between the cutter slide and the upper cutter support must be organised for movement in all directions, for example by means of ball joints.

The functional connection of the cutter slide to the upper cross cutter may consist of a thrust link and in this case the exit end of the upper cutter support has cheeks extending downwards on both sides of the link and between which the link is axially secured.

The arrangement of a linear guide for the independent cutter slide of the upper cross cutter within the lateral guides for the upper cutter support also involves the problem as to how the upper cutter support can extend up to the guide on the exit side in order to be supported by means of a roller. With this in view the cutter slide for the upper cross cutter is of U-shape in cross-section parallel to the cross cutter and the two side limbs extend on both sides of the upper cutter support and are provided with guide surfaces for engagement with linear guides. Thereby the exit end of the upper cutter support to which the link for operating the cutter slide of the upper cross cutter is connected, is extended in an overhung manner as far as a lateral guide on the shears stand since the projecting end of the upper cutter support is disposed between pairs of linear guides associated with the flanges of the U-shaped cutter slide. One side face of the upper cross cutter is conveniently contiguous to the upper trimming cutter in known manner. This has the advantage that the linear guides receiving the cutting pressure of the upper cross cutter can be supported against lateral cheeks of the shears frame.

One construction of a rolling cut trimming shears according to the invention is shown in the drawings in which:

FIG. 1 is a longitudinal section through the shears frame showing the upper cutter support in section as well as the upper cross cutter blade, and FIG. 2 shows on the left a cross-section on the line A – B and on the right a cross-section on the line C – D of FIG. 1.

The trimming shears shown consists of a shears frame 1 with side members 1a and 1b, a pair of crankshafts 2 and 3 with eccentrics 4 and 5 for driving connecting links 6 and 7 which are also connected to the upper cutter support 8 for the upper trimming cutter 9 which is provided with a curved cutting edge 9a. The eccentrics 4 and 5 are offset from one another angularly in such manner that the upper cutter support 8 executes a rocking movement on rotation of the crankshafts 2 and 3, the link 7 on the right-hand side moving downwardly in advance of the connecting link 6 when executing a trimming cut. A stationary bottom cutter 11 cooperates with the curved upper cutter 9. A plate 12 resting on the lower cutter support 10 and therefore being cut from right to left oppositely to the feed direction indicated by the arrow V so that the right-hand end 8a of the upper cutter support 8, as seen on FIG. 1, is the exit end.

The upper cutter support 8 is guided in the longitudinal direction at the entry side by a roller 14 bearing on a curved surface of a cam member 16, and on the exit side by a roller 18 bearing on a yieldably supported vertical plate 20. The cam member 16 as well as the plate 20 are carried by the side members 1a and 1b of the shears frame 1 and represent the guide means for the upper cutter support 8 to regulate the rocking movement in such a way as to obtain a rectilinear rolling-cut movement of the curved cutting edge 9a of the upper trimming cutter 9.

The exit end of the upper cutter support 8 drives a linearly guided cutter slide 24 by means of a thrust link 22 and said slide carries a cross cutter blade 26 the body part of which is contiguous with the upper trimming cutter 9. The cross cutter 26 is driven by the thrust link 22 and cooperates with a stationary bottom transverse cutter 27 to chop off the still attached waste strip 12a trimmed from the plate after the previous trimming cut. The chopped off waste strip 12a falls downward along a chute 28 into a scrap box, not shown.

The constructional arrangement of the interengagement between the exit end 8a of the upper cutter support 8 and the linear guides for the cutter slide 24 for the upper cross cutter 26 will be seen most clearly on FIG. 2. As shown, the exit end 8a of the upper cutter support 8 has downwardly extending cheeks 8b which locate the thrust link 22 axially which is pivotally supported by means of a pin 30.

The cutter slide 24 is of U-shape in cross-section as seen in FIG. 2 parallel to the cross cutter 26 and has two lateral flanges 24a and 24b which extend upwardly on both sides of the upper cutter support 8 and are provided at the side edges with guide surfaces. FIG. 2 shows in the lefthand section a wear strip fitted to one end face of the flange 24a forming one of four guide surfaces in all since both the flange 24a (FIG. 1) and also the flange 24b have in each case a pair of vertical end faces which are equipped with wear strips.

Two pairs of linear guides 32 and 34 are associated with the four guide surfaces of the flanges 24a and 24b of the cutter slide 24 of which the guides 34, are adjustable in a known manner by means of taper keys 35, serve to absorb the side pressure of the upper cross cutter 26 and are supported against the side cheeks 1b of the shears frame 1.

From FIG. 1 it will be seen that the projecting exit end 8a of the upper cutter support 8 together with the support roller 18 at the exit end extend respectively through the pairs of linear guides 32 and 34.

The thrust link 22 is pivotally connected to the cutter slide 24 by means of a pin 36 so that it provides a tensionally stiff connection between the end 8a of the upper cutter support 8 and the cutter slide 24. Alternatively the cutter slide 24 may be supported on coil springs and the thrust link 22 arranged as a strut in spherical or half-spherical sockets.

Obviously the cutter slide 24 is also guided transversely to the cutting forces occurring during chopping of the waste strip 12a by the angular construction of the linear guides 32 and 24.

At the beginning of an operating cycle of the trimming shears initially the exit end 8a thereof moves downwardly as a result of the rocking movement of the upper cutter support 8 whereby the cutter slide 24 is displaced in advance of the exit end of the curved upper cutter 9 as a result of the leverage action. The upper cross cutter 26 (FIG. 2) moves against the trimmed edge of the plate 12 and severs the waste strip 12a still attached to the plate. With the chopping cut or shortly thereafter the upper trimming cutter 9 commences the following trimming cut whereby the trimming cut is carried out up to the cutting position shown in FIG. 1. In this position of the cutters the eccentric 4 at the entry side is at its bottom dead-centre position. Thereupon the connecting link 6 at the entry side moves upwards so that the upper trimming cutter 9 moves clear of the plate and the latter can be slid forward in the direction of the arrow V by the length of the cutter.

By reason of the linear guiding of the cutter slide 24 the horizontal exit gap between the cross cutters 26, 27 remains constant during cutting although the upper cross cutter 26 is driven ultimately by the rocking movement of the upper cutter support 8.

What is claimed is:

1. Plate trimming shears comprising an upper cutter support including an upper cutter adapted to execute a rocking movement, a bottom cutter cooperating with said upper cutter for executing a trimming cut starting at the exit end of the shears due to the rocking movement of said upper cutter, upper and lower cross cutters mounted at the exit end of the shears for chopping waste strips, said upper cross cutter having a slide which is linearly guided and drivably connected by a thrust link to the exit end of said upper cutter support for effecting a cross cut at the start of a trimming cut.

2. Plate shears according to claim 1, characterised in that the exit end of the upper cutter support has cheeks extending downwardly on both sides of said thrust link connecting the upper cutter support to the cutter slide, to guide said slide.

3. Plate shears according to claim 2, characterised in that the cutter slide is of U-shape in cross-section parallel to the cross cutter and the two side limbs extend on both sides of the upper cutter support and are provided with guide surfaces associated with linear guides.

4. Plate shears according to claim 3, in which one side face of the upper cross cutter is contiguous to the upper trimming cutter, and linear guides receiving the cutting pressure of the upper cross cutter are supported against a side cheek of the shears frame.

* * * * *